(12) United States Patent
Koban

(10) Patent No.: US 6,485,178 B1
(45) Date of Patent: Nov. 26, 2002

(54) LINEAR UNIT WITH A SLIDING GUIDE FOR A SLIDE

(75) Inventor: Johannes Koban, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,016

(22) PCT Filed: Mar. 11, 1999

(86) PCT No.: PCT/DE99/00656

§ 371 (c)(1),
(2), (4) Date: Nov. 27, 2000

(87) PCT Pub. No.: WO99/51390

PCT Pub. Date: Oct. 14, 1999

(30) Foreign Application Priority Data

Apr. 7, 1998 (DE) .......................................... 198 15 474

(51) Int. Cl.7 ............................................. F16C 29/02
(52) U.S. Cl. ............................. 384/39; 384/40; 384/42
(58) Field of Search ............................. 384/7, 10, 13, 384/26, 38, 39, 40, 42

(56) References Cited

U.S. PATENT DOCUMENTS

| | | | | |
|---|---|---|---|---|
| 2,581,602 A | * | 1/1952 | Pulsifer ........................ | 384/39 |
| 3,953,086 A | * | 4/1976 | Chaffin ........................ | 384/39 |
| 4,630,944 A | * | 12/1986 | Moehr ........................ | 384/39 |
| 4,895,459 A | * | 1/1990 | Werner ........................ | 384/40 |
| 5,429,438 A | * | 7/1995 | Wood ........................ | 384/26 |

FOREIGN PATENT DOCUMENTS

| | | |
|---|---|---|
| DE | 22 34 428 | 1/1974 |
| DE | 36 31 401 A | 3/1988 |
| DE | 94 01 377 | 5/1994 |
| DE | 296 13 666 U | 12/1997 |
| GB | 1 095 391 A | 12/1967 |

OTHER PUBLICATIONS

Minitec Profilsystem Katalog 1993.
"Mechanik–Grundelemente", Oct. 1997, Robert Bosch GmbH—Geschaeftsbereich Automationstechnik, Stuttgart (DE) XP002108578 In Der Almeldung Erwaehnt Siehe Seite 9.3 Gleiter LE10 (3 842 515 272).

* cited by examiner

Primary Examiner—Thomas R. Hannon
(74) Attorney, Agent, or Firm—Michael J. Striker

(57) ABSTRACT

A linear unit (10, 10a, 10b) with a sliding guide (10) for a carriage (16, 16a, 16b) on a guide profile (12, 12a) is proposed. Slide elements (14, 14b, 14c, 14d) are fixable to the carriage (16, 16a, 16b). By means of a recess (50) in the carriage (16, 16a, 16b), an adjusting element (52) can be guided that engages a recess (48, 74) which is embodied in the slide elements (14, 14b, 14c, 14d). As a result, the slide elements (14, 14b, 14c, 14d) can move transversely to the guide direction of the guide profile (12, 12a), and as a result the play of the sliding guide (27, 27a, 27b) can be adjusted.

11 Claims, 3 Drawing Sheets

LINEAR UNIT WITH A SLIDING GUIDE FOR A SLIDE

BACKGROUND OF THE INVENTION

The invention is based on a linear unit with a sliding guide for a carriage as generically defined by the preamble to the main claim. One such linear unit is already known from the catalog entitled "Mechanik-Grundelemente" [Basic Mechanical Elements] '96/'97, page 9–3 published by Robert Bosch, GmbH, Stuttgart. The linear unit comprises a sliding guide and a carriage embodied as a sliding door, which carriage is guided on a guide profile with the aid of slide elements. Along its longitudinal outside faces, the guide profile has grooves in which the slide elements fixed to the carriage can be guided in sliding fashion. The production-dictated tolerances of the guide profile, which as a rule is extrusion molded, require that the slide elements have a large amount of play in the grooves, so that they do not become stuck. For applications that require higher precision, or in other words less play, for example when workpieces are to be positioned, however, these linear units are unsuitable.

SUMMARY

Accordingly, it is therefore an object of present invention to provide a linear unit of this type which avoids the disadvantages of the prior art.

In keeping with these objects, one feature of present invention resides, briefly stated, in a linear unit in which devices are provided for adjusting a plate of a sliding guide, and slide elements are movable transversely to a guide direction of a guide profile.

The linear unit according to the invention with a sliding guide for a carriage has the advantage over the prior art that the play of the sliding guide can be adjusted and thus adapted to the specific requirements. It is especially simple in this respect to provide devices in the form of recesses, which are embodied in a carriage and in slide elements and into which a bolt with an eccentrically formed-on peg can be guided. Sliding guides of a simple design can be converted, if grooves in which extensions of the slide elements can be guided are provided along the outside faces of a guide profile. By the embodiment of extensions with slide faces of various sizes for resting on the guide profile, the pressure per unit of surface area can be adjusted. The friction and frictionally dictated wear can be improved by recesses for receiving lubricant. By means of extensions on the slide elements that are adapted to various shapes of groove, a better positive engagement can be attained. Instead of recesses for adjusting the play, an advantageous embodiment provides for forming extensions onto the slide elements. Another advantageous possible modification is, instead of extensions on the slide elements that engage grooves on a guide profile, for recesses to be provided on the slide elements, with which recesses the extensions embodied on the guide profile cooperate.

BRIEF DESCRIPTION OF THE DRAWING

One exemplary embodiment of the invention is shown in the drawing and described in further detail below. Shown are.

DESCRIPTION OF THE PREFERRED EMBODIMENTS

Figure 1:
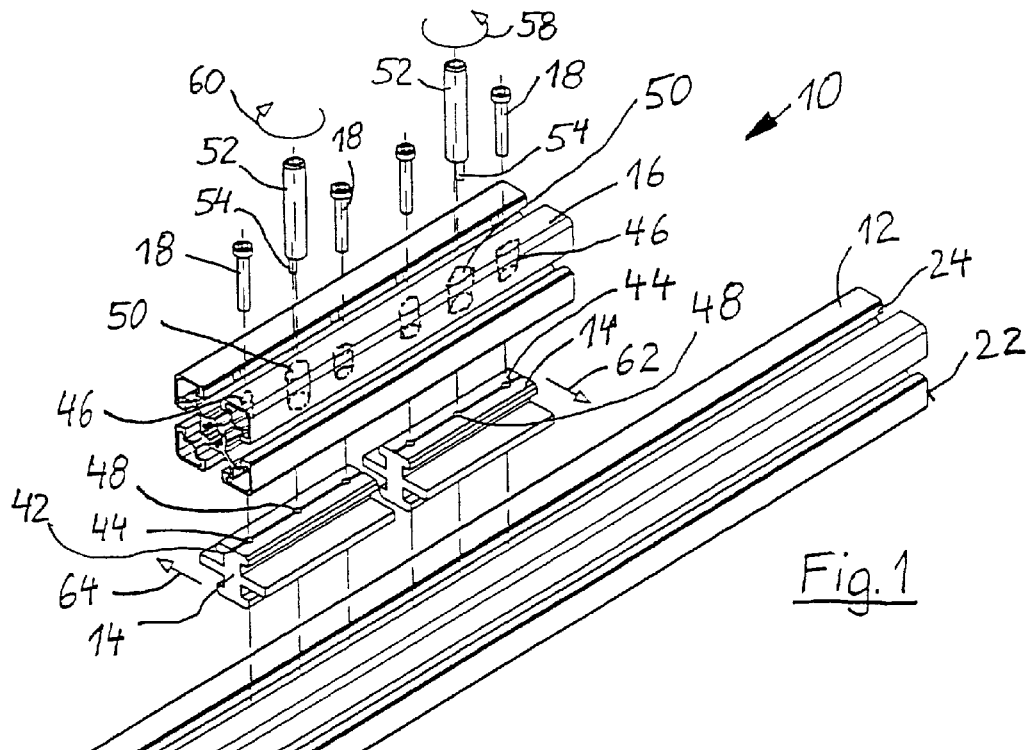
FIG. 1, a first linear unit with a sliding guide, in a perspective, exploded view.
Figure 2:
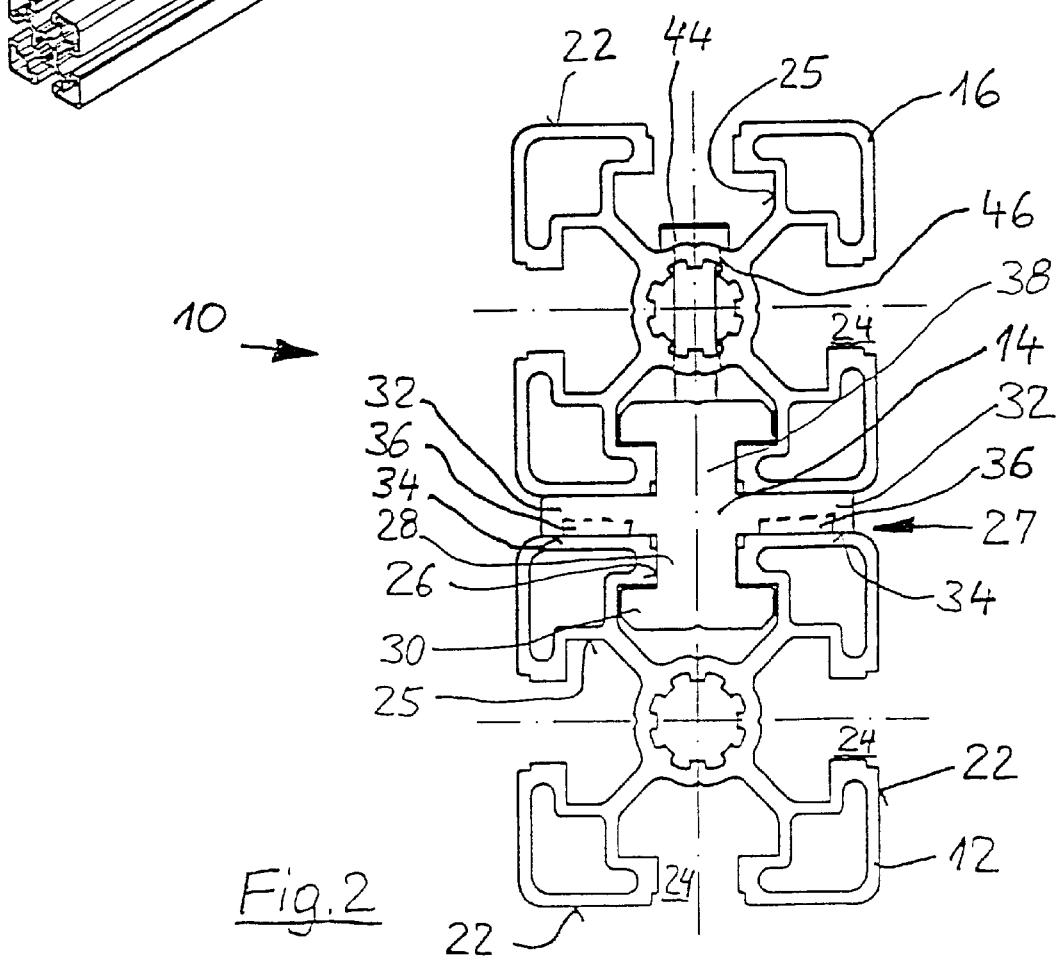
FIG. 2, an end view of the linear unit of FIG. 1, in the installed state.

In FIGS. 1 and 2, a first linear unit 10 is shown which substantially comprises a guide profile 12, two first slide elements 14, and a carriage 16. Each of the slide elements 14 can be fixed to the carriage 16 with two screws 18.

The guide profile 12 and the carriage 16 disposed parallel to it are for instance profile bars, known from the catalog "Mechanik-Grundelemente" '96/'97, published by Robert Bosch, GmbH, Stuttgart, of substantially rectangular outer contour. Except for the length, the guide profile 12 and the carriage 16 are embodied identically. In the exemplary embodiment shown, the carriage is substantially shorter than the guide profile 12. The guide profile 12 can be solidly joined to a substrate. However, it is also possible for the carriage 16 to be fixed while the guide profile 12 is disposed movably. The guide profile 12 and the carriage 16, along their longitudinal outside faces 20, have grooves 24 with an undercut 25. The longitudinal axes of the grooves 24 also correspond to the guide direction of the guide profile 12.

As seen particularly from FIG. 2, the slide elements 14 can be introduced, with first extensions 26, into the guide profile 12 from the face end of the guide profile 12. The first extensions 26 are adapted to the shape of the grooves 24 and are guided slidingly in the guide profile 12. This is accordingly a sliding guide 27 for the carriage 16 on the guide profile 12. To that end, the first extensions 26 have a T-shaped end 30, joined via a strut 28 to the remainder of the slide element 14. A strut 28 has a lesser width than the necks of the grooves 24. The T-shaped end 30 is also embodied as narrower than the width of the undercuts 25 of the grooves 24. By means of the T-shaped end 30, a positive engagement is created, as a result of which the carriage 16 can be moved only along the guide direction of the guide profile 12. At least one of the side faces of the strut 28 slides, in operation of the linear guide 10, along a side face of a neck of a groove 24.

The slide elements 14 also each have two second extensions 32, which are disposed perpendicular to the first extensions 26 and between the carriage 16 and the guide profile 12. The second extensions 32 also have slide faces 34, which rest on the guide profile 12. Advantageously, recesses 36 for receiving lubricant are embodied in the slide faces 34, and as a result friction and friction-dictated wear are minimized.

The slide elements 14 have third extensions 38, which are embodied like the first extensions 26 and are aligned with them. If structural conditions necessitate it, the third extensions 38 can be offset from the first extensions 26.

As seen particularly in FIG. 1, the third extensions 38, on one face 40, have a wedge-shaped groove 42, which can advantageously be used as an aid in drilling. Fastening bores 44 are made along this groove 42. However, because of the groove 42, bores can easily be made at other points. The fastening bores 44 serve to fasten the slide elements 14 to the carriage 16 with the aid of the screws. The carriage 16 to that end has four through bores 46, aligned with the fastening bores 44, for the screws 18. The fastening bores 44 are threaded bores. Alternatively, screws with a self-tapping thread can be used. For fastening the slide elements 14, nuts, not shown, placed on the opposite side can also be used.

In each slide element 14, between the two fastening bores 44, there is a first recess in the form of a further bore— hereinafter called the adjusting bore 48. In the carriage 16, there is also a second recess between the two through bores 46, and this is in the form of an additional bore—hereinafter called the introduction bore 50. The introduction bore 50 has a diameter such that bolts 52, two of which are shown in FIG. 1 above the carriage 16, can be passed through it. The bolts 52, on one face end, have a hexagonal recess for a tool, not shown, and on the other face end they have a peg 54, which is embodied eccentrically. The adjusting bore is also disposed such that the bolts 52 can be passed through the introduction bore 50, and the eccentrically disposed peg 54 can engage the adjusting bore 48. The bolt 52 having the peg 54 is an adjusting element, which will be addressed in more detail hereinafter.

In the installation of the linear unit 10, first the slide elements 14 are introduced, from one of the face ends of the carriage 14, into one of the grooves 24 until the fastening bores 44 are aligned with the through bores 46. The screws 18 are then guided through the through bores 46 and rotated into the fastening bores 44 until the slide elements 14 are still somewhat movable. Then the carriage 16, together with the slide elements 14, is placed from one of the face ends of the guide profile 12 into one of the grooves 24 of the guide profile 21. Next, a bolt 52 is guided through the introduction bores 50, until the peg 54 engages the adjusting bore 48. Since the peg 54 is disposed eccentrically, the slide elements 14, upon a rotary motion of the bolt 52 in the direction of rotation indicated in FIG. 1 by two arrows 58, 60, are movable transversely to the guide direction of the guide profile 12. Two arrows 62, 64 indicate the directions of displacement of the slide elements 14 and correspond to the arrows 58, 60 for the rotary motions of the bolts 52. An adjustment of play of the sliding guide 27 is thus possible. The slide elements 14 can be adjusted in such a way that one of the slide elements 14 comes to rest flat, with a side face of the strut 28, on one side wall of a neck of a groove 24, while the other slide element 14 rests flat with an end face of the strut 28 on the other side wall of a neck of a groove 24. In that case, the play is cancelled entirely. However, it also possible to allow somewhat more play instead. The play can be adapted to existing requirements, in particular to the required position.

The first recesses in the form of adjusting bores 48, the second recesses embodied as introduction bores 50, and the bolts 52 functioning as adjusting elements, together with the peg 54 are accordingly devices with which the slide elements 14 can be moved transversely to the guide direction of the guide profile 12 in order to adjust the play of the sliding guide 27.

Figure 3:
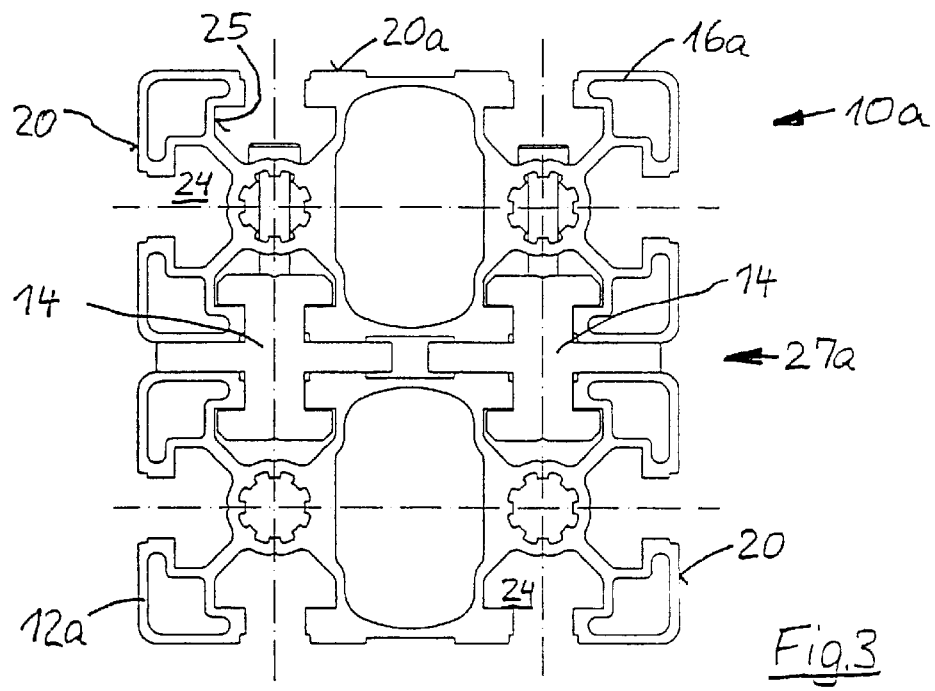
FIG. 3, an end view of a second linear unit.

In FIG. 3, a second, modified linear unit 10a is shown. The guide profile 12a is approximately twice as wide as the guide profile 12, and in two opposed outside faces 20a it has two grooves 24 each. The carriage 16a has the same cross-sectional area as the guide profile 12a but is substantially shorter. Two slide elements 14 are fastened to the carriage 16a in two parallel grooves 24, which are oriented toward the guide profile 12a. The sliding guide 27a, in contrast to the sliding guide 27, is thus wider and is capable of absorbing higher moments that act about the axis of the guide direction of the guide profile 12a. In the event of heavier loads, it is also possible for two slide elements 14 to be disposed in line with one another in a groove 24 of the carriage 16a. The course of adjustment of the play of the sliding guide 27a is analogous to that for the sliding guide 27.

Figure 4:
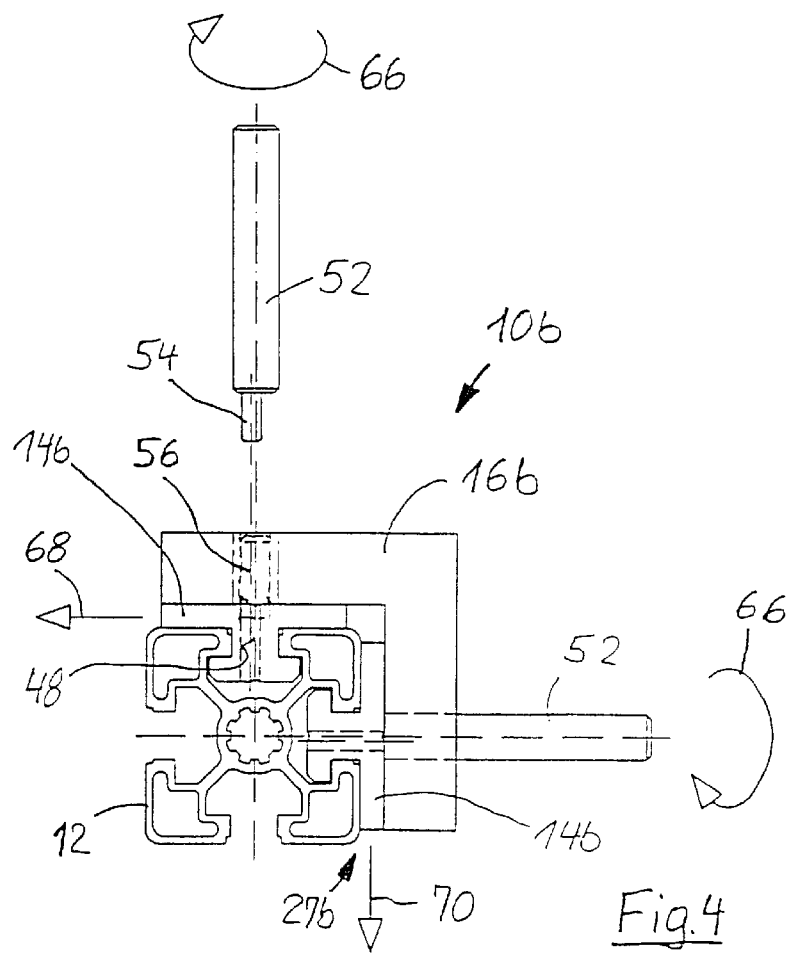
FIG. 4, an end view of a third linear unit.

FIG. 4 shows a third modified linear unit 10b with a modified carriage 16b, which is embodied as an L-shaped profile. It is disposed in the region of two outside faces 20, at right angles to one another, of a guide profile 12. The slide elements 14b are fastened to the carriage 16b with threaded pins 56 shown in suggested form. However, screws 18 can also be used. As also seen from FIG. 4, the slide elements 14b, in contrast to the slide elements 14, do not have third extensions 32. By means of the rotary motions with the bolts 52, represented by arrows 66, the slide elements 14 can be displaced in the directions indicated by two arrows 68, 70, in order to adjust the play in the sliding guide 27b. Depending on structural circumstances, the direction of rotation of the bolts 52 and thus of the adjustment of the slide elements can also be the opposite of that described above. Also in a modified form, the carriage can be U-shaped instead of L-shaped and can be guided and adjusted for instance in one groove 24 in each of three outside faces 22. Alternatively, a carriage can be embodied such that it surrounds the guide profile 12 completely and the play of the sliding guide is adjusted on all sides.

Figure 5:
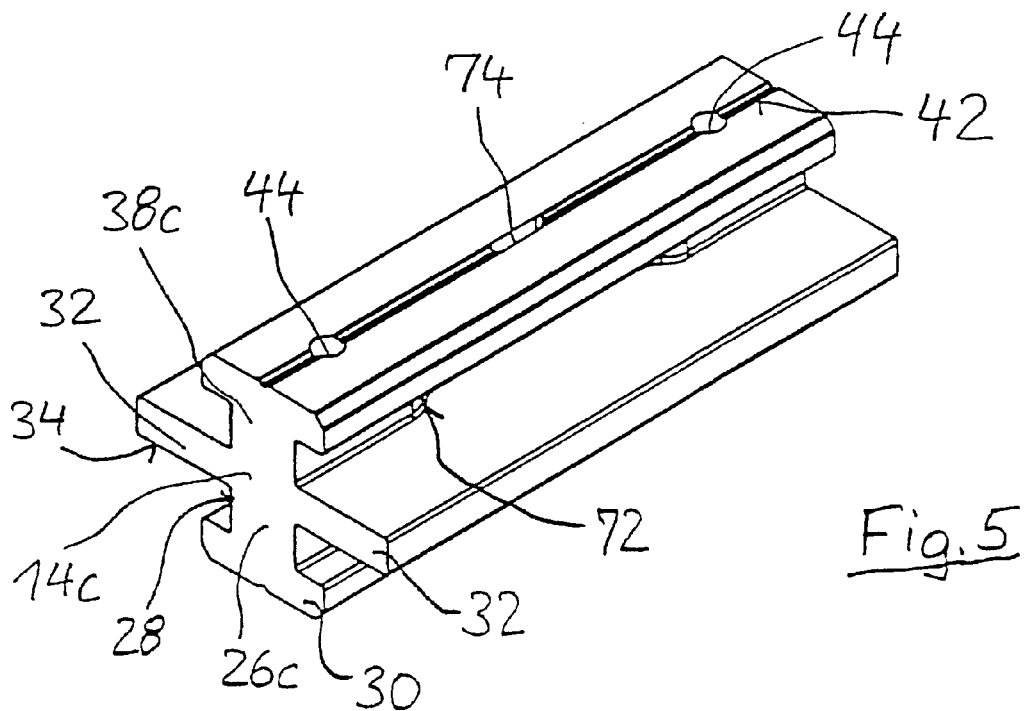
FIG. 5 and FIG. 6, two modified slide elements.

FIG. 5 shows a slide element 14c, on the first and third extensions 26c and 38c of which recesses 72 are embodied along the side faces that rest on or slide on the faces of a neck of a groove 24. The slide face still exists on both ends. As a result, torsion, in particular of the guide profile 12, advantageously has a less pronounced effect. Also, lubricant can be stored in the recesses of the third extension 38c. A recess in the form of a slot 74 is embodied in the slide element 14c. A screwdriver, for instance, can be inserted into this slot 74 and is guided by an introduction bore 46 of the carriage 14. The slide element 14c can thus be rotated and accordingly move transversely to the guide direction of the guide profile 12, and as a result the play of a sliding guide 27, 27a, 27b can also be adjusted.

Figure 6:
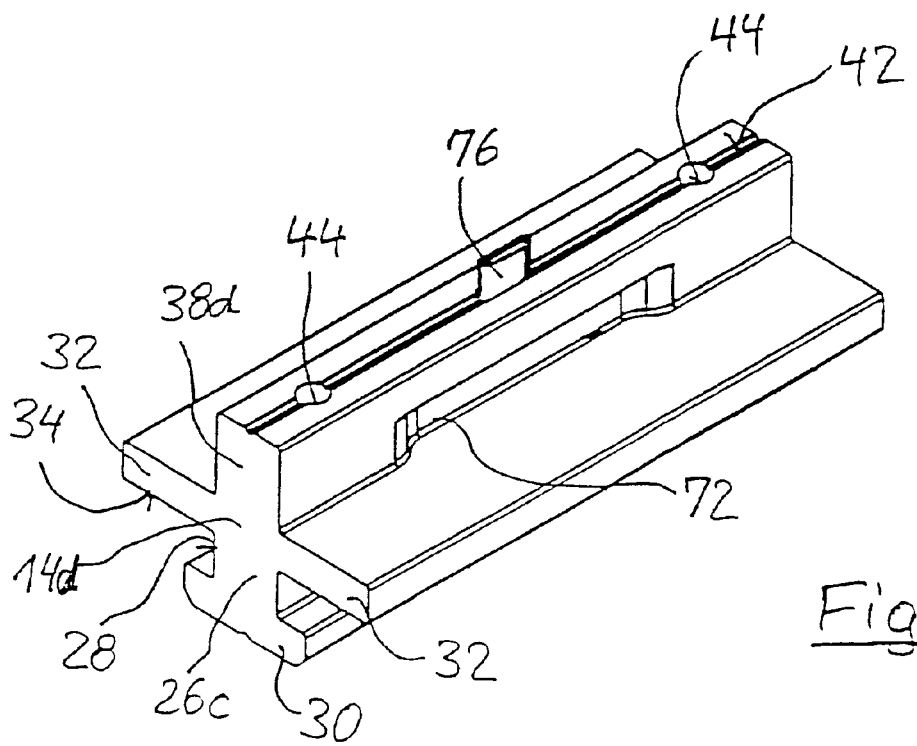

FIG. 6 shows a modified slide element 14d, whose third extension 38d does not have a T-shaped end 30. Instead of a recess in the form of an adjusting bore 48 or a slot 74, a strut-like extension 76 is embodied here, which can be grasped by an adapted adjusting element—under some circumstances, the hexagonal recess of the bolt 52 fits—so that the play of a sliding guide 27, 27a, 27b can be adjusted in this way.

A guide profile can alternatively, instead of the grooves 24, have extensions along its longitudinal outside faces, and these extensions engage corresponding recesses embodied on correspondingly embodied slide elements.

A guide profile can also be assembled from a plurality of profile bars, with at least one groove embodied in each profile bar. A carriage can also be assembled from multiple parts.

Instead of grooves 24 with an undercut 25, other shapes of groove can also be employed. The cross-sectional area can be wedge-shaped, dovetail-shaped, or half-round. Grooves with different shapes can also be embodied on a single guide profile. A sliding guide thus created need merely be embodied such that a carriage be movable during operation only along the guide direction of the guide profile.

What is claimed is:

1. A linear unit, comprising a sliding guide having a guide profile; a carriage having at least two slide elements fixable on said carriage and slidingly guidable on said guide profile, said guide profile and said slide elements have guiding formations which are guided over one another; adjusting elements guidable by bores provided in said carriage and cooperating with said slide elements, said adjusting elements, for adjusting a play of said sliding guide, being formed so that said slide elements are movable transversely to a guide direction of said guide profile and transversely to a longitudinal axis of said bores, said guiding formations include grooves provided in said carriage in which at least first extensions of said slide elements are guided along longitudinal outside faces of said guide profile.

2. A linear unit as defined in claim 1, wherein said slide elements have recesses cooperating with said adjusting element.

3. A linear unit as defined in claim 1, wherein said adjusting element is a bolt having at least one face and provided with a peg which is arranged eccentrically, said sliding elements having recesses, and said bolt being guidable by said bores, and said peg engaging said recesses.

4. A linear unit as defined in claim 1, wherein said slide elements have at least second extensions which extend perpendicularly to said at least first extensions and are disposed between said carriage and said guide profile, said at least second extensions having slide faces that rest on said guide profile.

5. A linear unit as defined in claim 4, wherein said slide faces are provided with recesses for receiving lubricant.

6. A linear unit as defined in claim 4, wherein said carriage along at least one of the longitudinal outside faces has grooves which are engaged by at least third extensions of said slide elements.

7. A linear unit as defined in claim 6, wherein said grooves of said guide profile have an undercut, said at least first extensions of said slide elements having a shape which is adapted to said grooves with said undercut.

8. A linear unit, comprising a sliding guide having a guide profile; a carriage having at least two slide elements fixable on said carriage and slidingly guidable on said guide profile, said guide profile and said slide elements have guiding formations which are guided over one another; adjusting elements guidable by bores provided in said carriage and cooperating with said slide elements, said adjusting elements, for adjusting a play of said sliding guide, being formed so that said slide elements are movable transversely to a guide direction of said guide profile and transversely to a longitudinal axis of said bores, said guide profile having extensions provided along longitudinal outside faces of said guide profile and engaging in recesses in said slide elements.

9. A linear unit, comprising a sliding guide having a guide profile; a carriage having at least two slide elements fixable on said carriage and slidingly guidable on said guide profile, said guide profile and said slide elements have guiding formations which are guided over one another; adjusting elements guidable by bores provided in said carriage and cooperating with said slide elements, said adjusting elements, for adjusting a play of said sliding guide, being formed so that said slide elements are movable transversely to a guide direction of said guide profile and transversely to a longitudinal axis of said bores, said slide elements have adjusting extensions cooperating with said adjusting elements.

10. A linear unit, comprising a sliding guide having a guide profile; a carriage having at least two slide elements fixable on said carriage and slidingly guidable on said guide profile, said guide profile and said slide elements have guiding formations which are guided over one another; adjusting elements guidable by bores provided in said carriage and cooperating with said slide elements, said adjusting elements, for adjusting a play of said sliding guide, being formed so that said slide elements are movable transversely to a guide direction of said guide profile and transversely to a longitudinal axis of said bores, said slide elements having adjusting extension which are grasped by said adjusting element that is guidable by said bores and said carriage.

11. A linear unit, comprising a sliding guide having a guide profile; a carriage having at least two slide elements fixable on said carriage and slidingly guidable on said guide profile, said guide profile and said slide elements have guiding formations which are guided over one another; adjusting elements guidable by bores provided in said carriage and cooperating with said slide elements, said adjusting elements, for adjusting a play of said sliding guide, being formed so that said slide elements are movable transversely to a guide direction of said guide profile and transversely to a longitudinal axis of said bores, said slide elements having a face with a wedge-shaped groove.

* * * * *